United States Patent [19]

Green

[11] 4,236,819

[45] Dec. 2, 1980

[54] IMAGERY WITH CONSTANT RANGE LINES

[75] Inventor: Leland D. Green, Sierra Madre, Calif.

[73] Assignee: The United States of America as represented by the Secretary of the Air Force, Washington, D.C.

[21] Appl. No.: 494,009

[22] Filed: Jul. 29, 1974

[51] Int. Cl.³ .......................... G01C 3/08; H04N 7/00
[52] U.S. Cl. .......................................... 356/5; 356/4; 356/371; 358/96; 358/107; 358/108; 358/109
[58] Field of Search ........................ 356/4, 5, 28, 371; 178/7.3 D, 7.5 D, DIG. 34, DIG. 36; 358/75, 60, 96, 107, 108, 109

[56]  References Cited

U.S. PATENT DOCUMENTS

| | | | |
|---|---|---|---|
| 3,360,987 | 1/1968 | Flower et al. | 356/5 |
| 3,527,533 | 9/1970 | Hook et al. | 356/5 |
| 3,565,528 | 2/1971 | Witte | 356/5 |
| 3,634,614 | 1/1972 | Geusic | 358/60 |
| 3,743,418 | 7/1973 | Heflinger | 356/5 |
| 3,879,133 | 4/1975 | Mathieu | 356/169 |
| 3,897,150 | 7/1975 | Bridges et al. | 356/5 |

Primary Examiner—Stephen C. Buczinski
Attorney, Agent, or Firm—Joseph E. Rusz; James S. Shannon

[57] ABSTRACT

Method and apparatus for showing the relative range from an active line scan sensor to a target, the changes in range being shown on a recording medium as an alternate series of bright and dark lines. In particular, a modulated laser beam having high frequency components is utilized to illuminate the target, the reflected energy received at the sensor having the same modulation frequency but phase modified by the transit time required to make the roundtrip from the sensor to the target and return. The phase difference between the received energy and the transmitted, or reference, energy is shown on the recording medium by directing a portion of the reference energy to a detector which is also responsive to the received energy.

Points in the image formed on the recording medium where the phase angles are the same can be made to appear white while the points where the phase angles differ by 180° can be made to appear black. The difference in the range between two black lines is equal to a specific sub-interval of the wavelength of the effective laser modulation frequency, the sub-interval being 1/n where n is the harmonic of the effective laser modulation frequency.

The scanning laser may be a mode locked laser, thereby providing a light output having high frequency components and precise frequency and phase stability.

1 Claim, 3 Drawing Figures

IMAGERY WITH CONSTANT RANGE LINES

BACKGROUND OF THE INVENTION

Active line scan sensors presently utilized in the prior art make imagery of an object by directing a beam of light generated, for example, by a laser, to the object and sensing the reflected energy. The beam of light is made to scan the object periodically, similar to a flying spot scanner. Resolution of the sensor is determined by the size of the illumination spot on the object, the spot being scanned such that each resolution element on the object is illuminated one at a time. The reflection from each resolution element may be individually recorded on film or other media. The active line scan sensors described are primarily operated from an aircraft, the object being imaged being the ground and targets thereon.

The beam of light, which may be generated from a laser, scans the ground in a direction perpendicular to the path of the aircraft. For each sweep of the sensor, a narrow line equal to the width of the resolution of the sensor is scanned on each side of the aircraft. The motion of the aircraft allows successive adjacent lines to be scanned, the sensor viewing each resolution element as it is illuminated by the laser beam. Part of the optical reflected energy is detected by photodetectors in the sensor, the resulting electrical video signals being amplified, processed and used to control an optical film writing system, such as a strip map.

The prior art systems using optical techniques to measure the distance from a transmitter to a reference plane, such as described in U.S. Pat. Nos. 3,602,594; 3,446,971; 3,619,058; and 3,649,123, although providing reflectivity and distance information, do not provide imagery information, visual or otherwise, including the height, depth and/or slope of objects located at the reference plane. Further, in order to ensure accurate distance measurements with high resolution capability, the scanning laser utilized should be capable of generating light pulses of very precise frequency and phase stability, the pulse train preferably comprising relatively high frequency (harmonic) components.

SUMMARY OF THE PRESENT INVENTION

The present invention provides method and apparatus for showing the relative range from an active laser line scan sensor to a reference plane, the changes in range being shown on a recording medium, as an alternate series of bright and dark lines similar to contour lines or optical "fringe" lines. In particular, a laser beam is utilized to illuminate the reference plane, the energy which is received at the sensor having the same modulation frequency but phase modified by the transit time required to make the round trip from the sensor to the reference plane and return. The phase (angle) difference between the received energy and the transmitted or reference energy is shown on the recording medium by directing a portion of the reference energy to a detector which is also responsive to the received energy. Points in the image formed on the recording medium where the phase angles are the same can be made to appear white, while the points where the phase angles differ by 180° can be made to appear black. The difference in the range between two black lines is equal to a specific sub-interval of the wavelength of the effective laser modulation frequency, the sub-interval being 1/n where n is the harmonic of the effective laser modulation frequency. The scanning laser in the preferred mode, is operated as a mode locked laser thereby providing a light output having high frequency components and phase frequency and phase stability.

It is an object of the present invention to provide method and apparatus for showing relative ranges between an active line scan sensor and a reference plane.

It is a further object of the present invention to provide method and apparatus for showing the relative range of a scanner sensor to a reference plane on a recording medium by a series of bright and dark lines, the difference between two black lines being equal to the a specific sub-interval of the wavelength of the effective laser modulation frequency, the sub-interval being 1/n where n is the harmonic of the effective laser modulation frequency.

It is still a further object of the present invention to provide method and apparatus for showing the relative range of a laser scanner to a reference plane, such as ground, the changes of range being shown on a recording medium by a series of bright and dark lines, adjacent black lines being separated by a specific sub-interval of the wavelength of the effective laser beam modulation frequency, the sub-interval being 1/n where n is the harmonic of the effective laser modulation frequency, whereby information regarding the height, depth and slope of targets situated at the reference plane may be ascertained.

It is a further object of the present invention to provide a laser scanning system which produces object range and contour information, the system in the preferred mode utilizing a mode locked laser.

DESCRIPTION OF THE DRAWINGS

For a better understanding of the invention as well as other objects and features thereof, reference is made to the following description which is to be read in conjunction with the accompanying drawings wherein.

DESCRIPTION OF THE PREFERRED EMBODIMENT

The invention herein described was made in the course of or under a contract with the Air Force Avionics Laboratory, Air Force Systems Command, Wright Patterson Air Force Base, Ohio, Contract No. F33615-72-C-1140.

As will be described in more detail hereinafter, a mode locked laser generates the scanning beam utilized in the preferred embodiment of the range contour imagery of the present invention. Therefore, a brief description of the mode locked laser is set forth hereinafter.

Since optical cavity resonators (the Fabry-Perot interferometer, for example) utilized to produce laser light output are much larger than the wavelength of the signals employed therein, there are inherently multimode devices. Therefore, lasers are capable of simultaneously oscillating at a plurality of bands of frequencies whose nominal center-to-center spacings $f_c$ are given by $c/2L$, where c is the velocity of light and L is effective cavity length. Thus, the output spectrum from an optical laser generally consists of a plurality of spaced, discrete bands of frequencies (longitudinal modes), the amplitude and frequency thereof varying with time in a random fashion. As a consequence, the output from the laser is noisy, being randomly modulated at a frequency given approximately by the separation $f_c$ between adjacent longitudinal modes. If this situation was not corrected, it would materially limit the utility of the laser for certain purposes, such as in range determinations as described hereinabove. The stabilization of the amplitude and frequency of the longitudinal modes, however, is achieved by internally modulating the laser in a synchronous frequency. The synchronous frequency, as that term is used in the prior art, defines a frequency within a band of frequencies whose center is nominally given by $nc/2L$ here n is an integer and L is the effective length of the cavity for the mode at the center of the Doppler-broadened gain curve, and whose bandwidth is of the order of $10^{-5}$ $nc/2L$.

The output of the laser, when synchronously modulated, consists of a series of pulses whose repetition rate equals the modulating frequency, i.e., $c/2L$. A more detailed description of mode locking is set forth in U.S. Pat. Nos. 3,412,251 and 3,648,193.

Figure 1:
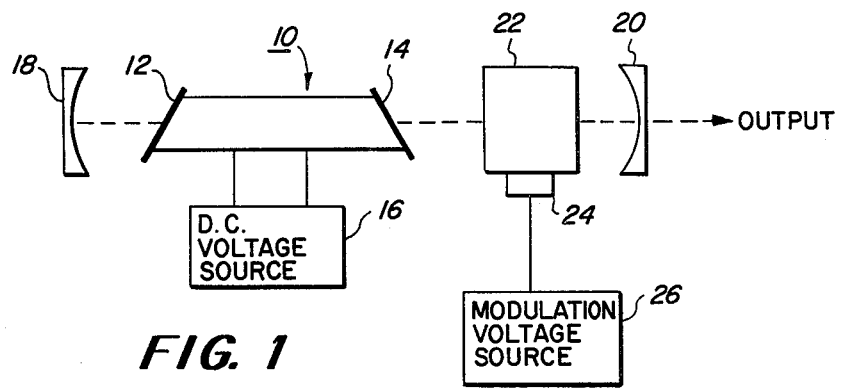
FIG. 1 is a schematic block diagram of a mode locked laser which may be utilized in the present invention.

FIG. 1 illustrates schematically a laser which may be utilized with the present invention. In particular, an argon-ion laser 10 comprises an enclosed, elongated tube having the ends 12 and 14 thereof inclined at the Brewster angle to minimize reflections. D.C. voltage source 16 is connected to the laser electrodes for supplying the power necessary to maintain a gas discharge within tube 10 for establishing a population inversion in the active medium of the laser, in this case argon. It should be noted that other laser active medium may be utilized, such as He-Ne gas lasers and solid state lasers. as well as other techniques for causing population inversion, such as optical pumping. Tube 10 is located within an optical cavity defined by mirrors 18 and 20, one of the mirrors (mirror 20 in the embodiment illustrated) being made partially transmissive such that the desired wave energy can be coupled out of the cavity through the mirror.

Located within the cavity and interposed between end 14 and mirror 20 is an acoustic-modulator 22 which may comprise a fused quartz block. An ultrasonic standing wave is induced in modulator 22 by means of ultrasonic transducer 24 mounted to the cavity wave. Source 26 comprises a tunable radiofrequency oscillator which produces a variable frequency sinusoidal modulation voltage, the modulation frequency being tuned to the laser intermode frequency ½ of $c/2L$ to mode lock the laser. It is to be noted that the effective modulation frequency of the mode locked laser (the frequency of the laser output beam) excited by an acoustic optic modulator is twice that of the excitation frequency of the laser. In the particular embodiment illustrated, the frequency signal applied to transducer 24 was approximately 47.2 MHz. The magnitude of the modulation voltage required to produce mode locking can be determined by standard techniques, i.e., the output of the laser can be coupled to an optical scanning interferometer and the voltage coupled to transducer 24 adjusted until the observed laser modes become stable and relatively noise free. The length of the argon laser set forth in FIG. 1 is 62.5 inches long, corresponding to an output pulse repetition rate of 94.4 MHz and mirrors 18 and 20 were dielectric coated peaked for operation at 5145Å.

It should be noted that non-mode locked lasers can be utilized to generate the scanning light beam of the present invention such as a modulated light source, such as a gallium arsenide solid state laser wherein the input current is modulated appropriately, or an externally modulated laser. The characteristics of the scanning laser light beam which are necessary to the operation of the present invention is that the frequency and phase of the reference waveform remain constant during the time it takes for the transmitted beam to reach the target or ground and return, i.e., the transit time. Furthermore, the frequency and phase should remain relatively constant to make it possible to obtain accurate measurements, such as when the height of an object is to be measured and the object is several fringes high. Additionally, the beam should comprise high frequency components and have the capability of being amplitude modulated.

Since a mode locked laser provides high frequency components with precise frequency and phase stability, has the required beam characteristics, and provides an output beam with relatively low power input, it is the preferred laser configuration. The repetition rate of the mode-locked laser is a function of the length of the laser cavity, the phase stability being a function of the modulating source 26. The particular embodiment described hereinafter comprises a mode locked argon ion laser with a repetition rate of approximately 94.4 MHz and a pulse width of less than 250 picoseconds.

As is well known, the Fourier transform of a pulse train in the time domain is a summation of all harmonics. To obtain the results of the present invention, described in more detail hereinafter, a standard high frequency radio receiver was tuned to a preselected harmonic, the receiver comprising a system for detecting the amplitude modulation of the input signal. As the line scan system scans the reference plane and any targets thereat, the power returned to the sensor varies as a function of the reflectivity of the object being scanned. When tuned to the preselected harmonic of the transmitted light beam signal, the radio receiver detects the power received by the sensor at that particular harmonic and provides a video signal which is used to drive a film recording system.

The rings, or "fringes", in the recorded pattern are generated by feeding a portion of the transmitted optical energy back into the optical detector (photomultiplier tube) associated with the line scan laser, resulting in a correlation signal being provided to the radio receiver, the resulting video signal simultaneously containing range as well as reflectivity information, as well as information which can provide the vertical (or third) dimension of a scanned object which increases the accuracy of the object identification process.

The effective spacing on the object between two adjacent black lines in the imagery can be varied by utilizing a preselected harmonic. The spacing is equal to the length of the laser cavity divided by N, where N is the number of the harmonic being used. For example, assuming the pulse modulating frequency rate was selected to be 94.4 MHz, the eighth harmonic has a frequency of 755.2 MHz. If the length of the laser cavity is 62.56 inches, the spacing between black fringes in the imagery is 7.82 inches, and the change in range from the sensor to the reference plane is 7.82 inches.

The operation of the present invention may be better visualized by conceiving that the sensor is at the center of a series of concentric spheres each having a difference of radius of 7.82 inches for the example set forth hereinabove. A black line is produced when these spheres intersect the reference plane or objects located at the reference plane. Slope differences appear as changes in the angles of the contour lines, the interruption of the contour lines indicating that objects of different height are being scanned.

Figure 2:
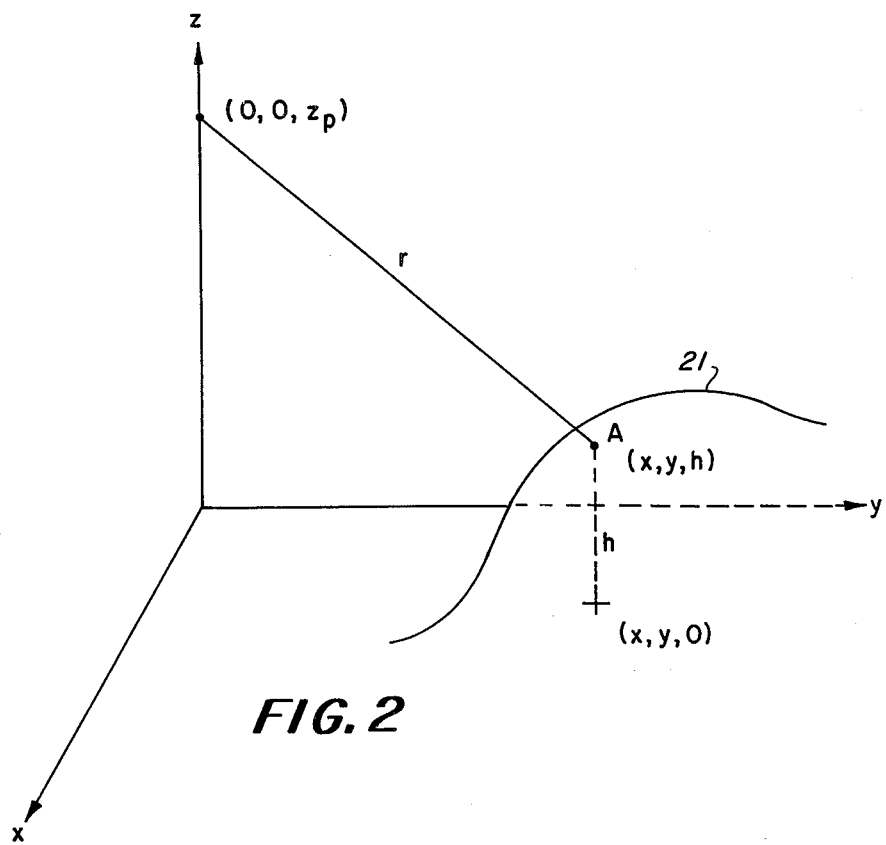
FIG. 2 diagrammatically illustrates how the present invention is utilized to provide object contour information.

Referring now to FIG. 2, an illustration showing how object contour information is ascertained is set forth.

An object 21, such as a mound, is referenced at a particular position in a three dimensional coordinate system, the coordinate system utilizing x, y and z coordinates. The laser is located at point P (O, O, $z_p$) and point A, a typical point on the surface of mound 21, is located at (x, y, h), h being the height of point A above datum plane z=0.

In general terms, an object surface, defined by the height function h=f(x,y), reflects light at point A.

Since r is the range from the laser transmitter to point A r may be written as:

$$r = [x^2 + y^2 + (z_p - h)^2]^{\frac{1}{2}} \quad (a)$$

$$r = [x^2 + y^2 + (Zp - f(x,y))^2]^{\frac{1}{2}} \quad (b)$$

When an echo signal (reflected light beam) is returned, the values for x and y are established by well-known line scan technology; moreover the value of the laser above a datum, i.e., $z_p$, is also independently known. The contouring establishes quantized values of range $r_n$. Thus, by equation (b), local height differences in the function h=f (x,y) can be computed. Restating this, it is noted that if x, y, $z_p$ and $\Delta r$ are known, Eq. (b) permits the calculation of $\Delta h = \Delta f$ (x,y), where $\Delta r$ is an increment in r and $\Delta h$ is an increment in h.

The system will give bright to bright lines in the generated imagery for distance $\Delta r$ which are L/n apart (L is the laser cavity length and n is the number of the harmonic utilized).

Therefore, as the laser beam scans object 21, the height (or contour) thereof in relation to the datum plane x,y can be ascertained for the object surface intersected by the laser beam.

Figure 3:
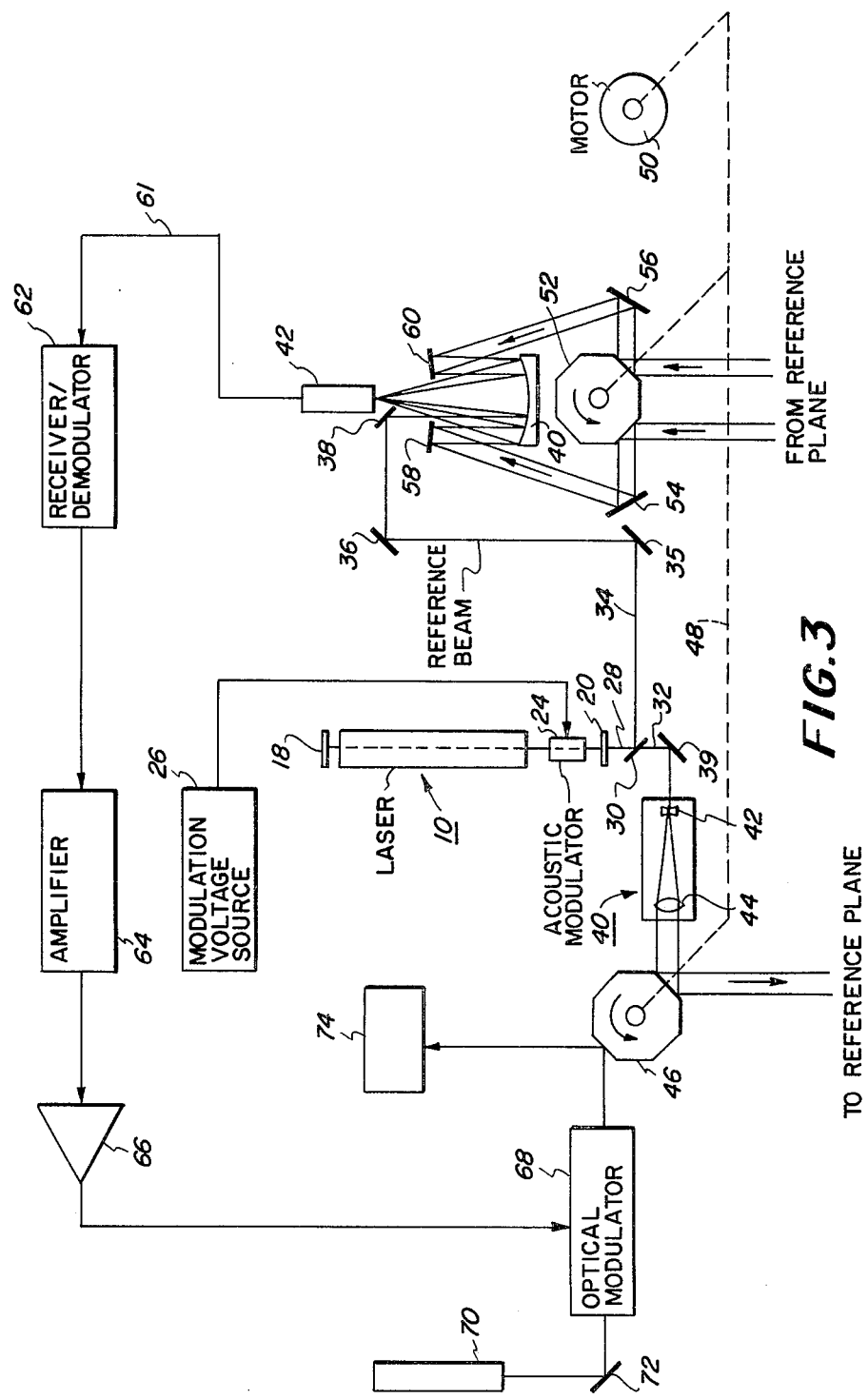
FIG. 3 is a schematic diagram of the apparatus utilized in the present invention.

Referring now to FIG. 3, a block diagram of the present invention is illustrated.

A mode locked laser 10, described in reference to FIG. 1 hereinabove (corresponding numerals in each figure indicating that the corresponding elements are identical) generates a coherent, amplitude modulated, pulsed light beam 28 which impinges upon beam splitter 30. It is to be noted at this point that a mode locked laser is modulated internally. If an alternate source of high frequency laser light is utilized, an acoustic-optic or electro-optic modulator may be utilized to modulate the laser beam. Beam splitter 30 separates the incident light beam 28 into a transmit portion 32 and a reference portion 34. Reference portion 34 is directed by a series of mirrors 35, 36 and 38 onto a reflecting lens 40 for reflection back onto photomultiplier tube or other light signal detector 42. Transmit portion 32 is reflected by mirror 39 into beam modifier comprising lens 42 for expanding the transmit portion 32 and collimator lens 44 for collimating the expanded beam. The collimated output beam impinges upon the face of a rotating polygon transmit scanner 46 which transmits the laser beam incident thereon to the reference plane being scanned (not shown in the figure). The scanning polygon 46 is mechanically driven by shaft 48 via motor 50, shaft 48 and motor 50 also driving receiving rotating polygon scanner 52 which receives reflected laser light from the reference plane and/or targets situated thereat. The laser beam reflected from the reference plane (or target) is directed by scanner 52 to mirrors 54 and 56 which reflect the beam incident to mirrors 58 and 60, respectively. Mirrors 58 and 60 in turn reflect the returned laser beam onto reflecting lens 40 which reflects the laser beam onto photomultiplier tube 42. It should be noted at this point that the energy incident on photomultiplier tube 42 comprises both laser light reflected from the reference plane (target) and a portion of the laser beam generated by mode locked laser 10. The output of photomultiplier tube 42 is coupled via antenna terminal 61 to a receiver/demodulating unit 62, the output thereof being coupled to amplifier 64. The output of amplifier 64 is coupled to an optical modulator driver 66, the output thereof being coupled to optical modulator 68. The output of laser 70, incident on mirror 72, is thereafter coupled to optical modulator 68. The laser beam at the output of optical modulator 68 is incident upon rotating polygon 46, the polygon 46 directing the modulated laser beam to utilization device 74, such as a strip recorder. The rotating polygon 46 operating in synchronism with rotating polygon 52, causes the beams reflected therefrom (the beam portion transmitted to the reference plane and the modulated beam incident on the utilization device 74) to operate in a scanning mode. It should be noted that other conventional scanning devices may be utilized in lieu of the rotating polygons. Optical modulator 68 may include a voltage variable retardation cell with a quarter wave plate polarization analyzer which imposes an amplitude modulation of the beam applied thereto.

In operation, mode locked laser 10 provides the energy which is directed toward the reference plane and targets located thereat. A portion 34 of the transmitted laser is incident on mirrors 35, 36 and 38, and lens 40 and reflected back to photomultiplier tube 42. The energy returned from the reference plane, reflected by mirrors 54, 56, 58, 60 and lens 40, is similarly incident upon photomultiplier 42, which is preferably a wide band (i.e., a bandwidth up to 2.0 GHz) photomultiplier tube. The energy, or power, in each of the harmonics comprising the output of the mode locked laser may be conceptualized as being amplitude modulated by the reflectivity of the element being scanned.

The photomultiplier tube (or other photodetector device) current is the square of the sum of the incident optical electric field from the target scene and the electric field of the reference laser beam and can be expressed as follows:

$$i(t) \propto [E(t) + E_R(t)]^2 \quad (1)$$

where E is the electric field resulting from laser energy reflected from the target scene and $E_R$ is the electric field of the reference laser beam. E(t) may be expressed as a harmonic series as follows:

$$E(t) = A \sum_{p=-N}^{N} \cos[2\pi(f_o + pf_c)(t - \frac{2R}{c})] \quad (2)$$

where
A = a constant
$f_o$ = the optical frequency (5.8 × 10$^{14}$ Hz for an argon laser operating at a wavelength of 5145Å

$f_c$ = the frequency spacing between laser modes (94.4 MHz) for the mode locked laser
R = the range or distance between the sensor and the scanned scene
c = speed of light
N = positive integer = one half the number of modes of the laser.

The expression for the reference signal $E_R$ is similar but does not have the 2R/c term, i.e., $$E_R(t) = B \sum_{p=-N}^{N} \cos[2\pi f_o + pf_c)t] \quad (3)$$

where B is a constant.

The terms resulting from the expansion of equation (1) may be identified (relating the terms to prior art terminology) as:
(a) $E^2(t)$ = crystal video mixing term
(b) $2 E(t)E_R(t)$ = complete optical superhetrodyne term
(c) $E_R^2(t)$ = local oscillator term Although the detailed reasons are not set forth herein, it has been found that the operation of the present invention is satisfactory in the visible to near infrared spectrum (0.4 to 2.0 μm) and depends on terms (a) and (c) only and not on the (b) optical superhetrodyne term. A system operating in the 2 to 100 μm region requires a local oscillator for sensitive performance; in this case the main signal component will generally be term (b). This leads to a system which is inherently not too critical of adjustment, and also permits variations in the type of mixing utilized.

By substituting equations (2) and (3) into (1) and averaging over many optical cycles, but retaining the time varying components through the gigahertz range, the expression for the photodetector current, $i_q(t)$, for the $q^{th}$ harmonic can be shown to be proportional to:

$$i_q(t) \alpha \left\{ C_1^2 + (C_2\rho)^2 + 2C_1C_2\rho\cos[2\pi q f_c \cdot (\frac{2R}{c})] \right\}^{\frac{1}{2}} \cdot \sin \pi 2 \, q f_c t \quad (4)$$

Range Contour Amplitude Term        Carrier of $q^{th}$ harmonic where
$C_1$ = reference level
$C_2\rho$ = level of signal incident on the photodetector from the target scene. Here, $\rho$ equals the reflectivity of objects in the target scene.

It can be shown that $i_q(t)$ can have a zero magnitude if $c_1 = c_2\rho$ and the phase angle is $2\pi(2n+1/2)$ where n is any integer. The current $i_q(t)$ is maximum when the phase angle $[2\pi q f_c(2R/c)]$ is equal to $2\pi$ (n) where n is any integer, the value n being equal to the number of wavelengths, at frequency $qf_c$, between the sensor (photodetector) and the target scene. The best range contour contrast is obtained when the reference power level is equal to the received energy from the ground, the detector current becoming zero with the reference laser beam power made equal to the power received, proportional to the reflectivity of the scanned scene, through the sensor optical system.

Therefore, the white lines on the range contour imagery occur whenever the argument of the cosine term changes by $2\pi$ (the spacing between the current minimum of the photodetector output corresponds to the spacing of range lines in the imagery).

Thus, $2\pi q f_c (2\Delta R/c) = 2\pi$. (5)

Solving for $\Delta R$ and substituting $f_c = c/2L$
where
c = speed of light
L = spacing between end mirrors in the laser cavity, yields $\Delta R = L/q$. (6)

It is therefore seen that the change in range between the sensor and target scene required to make the argument in equation (4) change by $2\pi$ is equal to the length of the laser cavity divided by the harmonic number. For example, with the radio receiver tuned to the 9th harmonic (849 MHz), the white lines occur whenever the range changes by 62.5 inches/9 or 6.95 inches. Therefore, observation of the utilization device readout will provide the observer with information regarding the change in range (relative range) between the sensor and the reference plane. Note that the output of photodetector 42 may, if desired, be monitored on an oscilloscope, for example, to ascertain relative range information. Further, as described with reference to FIG. 2, the height, depth and contour of an object at the reference plane can be readily ascertained. It should be noted that the data processing apparatus, such as a computer, may be utilized to calculate the actual range between the sensor and reference plane as well as the actual contour information of a target.

The orientation or alignment of the reference beam, it should be noted, with respect to the reflected energy from the reference plane does not affect the results obtained in accordance with the teachings of the present invention. The output of the photomultiplier tube 42 is amplified by high-frequency amplifier 62 which has a narrow band pass filter incorporated therein. Although unit 62 is shown to be a unitary device comprising both a receiver and demodulator, separate receiver and demodulator devices may be utilized. The video signal output of demodulator 62, comprising reflectivity and range contour information, modulates the output of laser 70 whereby a contour pattern is recorded on utilization device 74.

In the preferred embodiment, the receiver/demodulator 62 comprises an ultra-high frequency receiver having a tuning range, for example, from 0.1 to 2 GHZ which is capable of being tuned to one of the harmonics in the video signal developed by the photomultiplier tube 42. The radio receiver includes an intermediate frequency amplifier, operating as a bandpass filter, and an amplitude demodulator, the amplitude demodulator being capable of demodulating any one of the harmonics which comprise the output of mode locked laser 10. It should be noted that if selectivity is not required and if the range resolution produced by utilizing the laser modulation frequency is sufficient, the receiver portion of receiver/demodulator 62 may be eliminated.

The light facet rotating scanning polygons 46 and 52, shown in two sections in the figure, may comprise a one-piece assembly for transmission and reception. When the device shown in FIG. 2 is mounted on an aircraft, forward motion of the aircraft provides one axis of scanning, while the sensor scans the single line beneath the aircraft.

The output of the receiver/demodulator 62 is used to amplify and amplitude demodulate one of the harmonics to which it is tuned. The resulting electrical video signal at the output thereof contains, as set forth hereinabove, a combination of the reflectivity video signal and range contour lines. The train of very narrow pulses generated by mode locked laser 10 is very high in harmonics. If the laser 10 is modulated at a frequency of 94.4 MHz, for example, 24 or more harmonics may be generated simultaneously. By tuning the receiver 62 to the appropriate harmonic, range contour imagery can be made using the fundamental frequency whereby the contour lines would be spaced 62.5 inches, the fourth harmonic whereby the contour spacing would be 15.6 inches or the ninth harmonic whereby the contour spacing would be 6.95 inches.

The spatial resolution of the optical ranging system described hereinabove is retained since it is related to the wavelength of the laser light being utilized. The range contour information is not related to the optical wavelength but the resolution thereof is a function of the laser modulation frequency.

While the invention has been described with reference to its preferred embodiment, it will be understood by those skilled in the art that various changes may be made and equivalents may be substituted for elements thereof without departing from the true spirit and scope of the invention. In addition, many modifications may be made to adapt to particular situations or material to the teaching of the invention without departing from its essential teachings.

What is claimed is:

1. Apparatus for producing a range contour map of an area consisting of spaced constant range lines with equal range differences between adjacent lines, comprising:
   a mode-locked laser producing a beam of pulsed light of highly stable pulse repetition frequency,
   means for splitting said beam into first and second beams,
   means for scanning said area with said first beam,
   a photodetector for converting an optical signal at its input into an electrical signal at its output,
   means for applying light reflected from said area as a result of said scanning to the input of said photodetector,
   means for applying said second beam to the input of said photodetector,
   a radio receiver tuned to a harmonic of said pulse repetition frequency and containing demodulating means for producing at its output a signal representing the amplitude modulation of a radio frequency signal at its input,
   means for applying the output signal of said photodetector to the input of said receiver, and
   means synchronized with said scanning means for making a visual recording of the output of said receiver, said recording constituting said contour map.

* * * * *

UNITED STATES PATENT AND TRADEMARK OFFICE
CERTIFICATE OF CORRECTION

PATENT NO. : 4,236,819
DATED : December 2, 1980
INVENTOR(S) : Leland D. Green

It is certified that error appears in the above-identified patent and that said Letters Patent are hereby corrected as shown below:

Col 2, line 13, delete "the" (first occurrence).

Col 8, line 62, change "Fig. 2" to --- Fig. 3 ---.

Signed and Sealed this

Twenty-fourth Day of March 1981

[SEAL]

*Attest:*

RENE D. TEGTMEYER

*Attesting Officer*     *Acting Commissioner of Patents and Trademarks*